Jan. 20, 1953     L. M. PERSONS     2,626,012
FEED CONTROL FOR PAPER FILTERS
Filed May 19, 1947
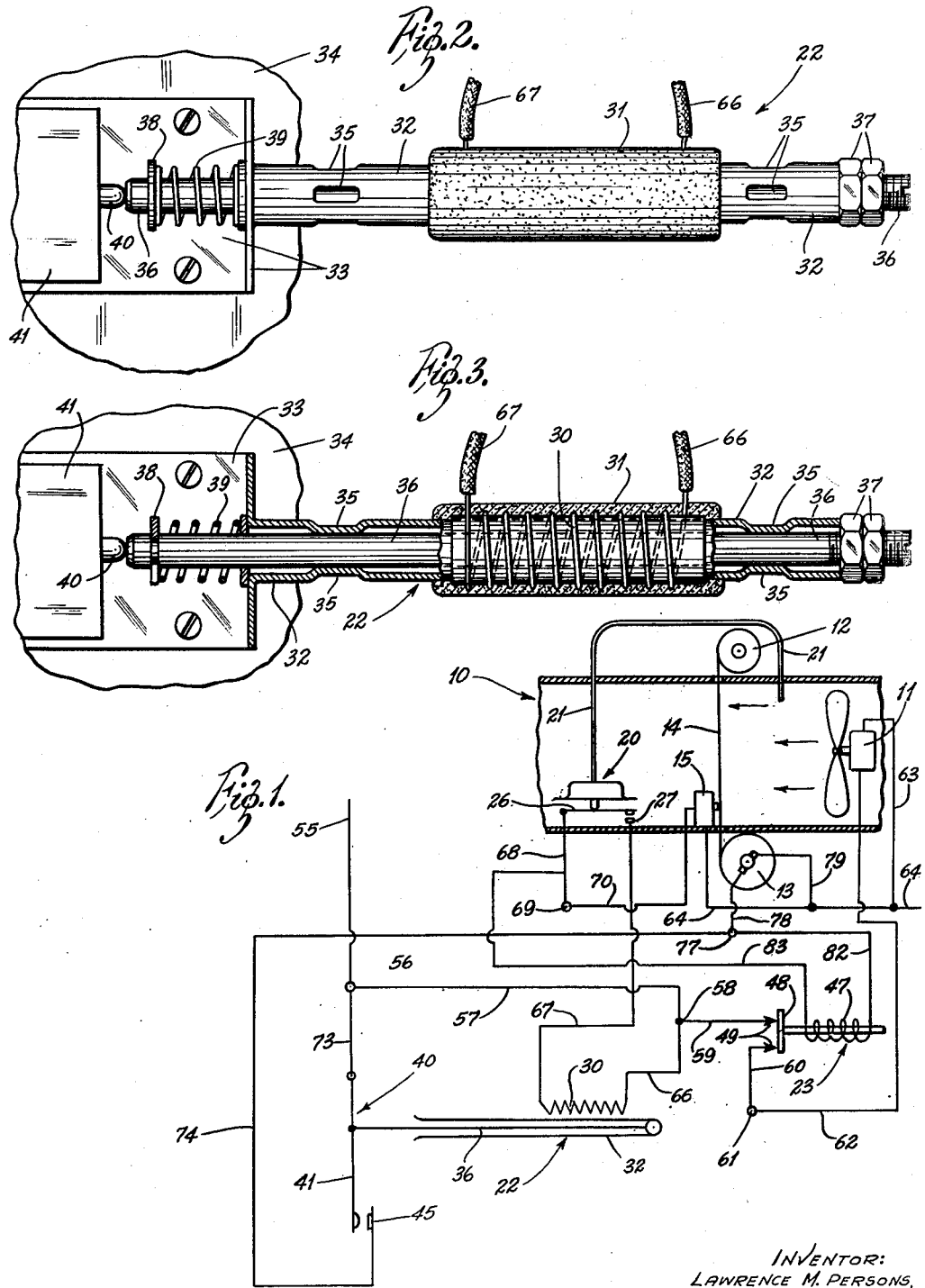
INVENTOR:
LAWRENCE M. PERSONS,
BY Kingsland, Rogers & Ezell
ATTORNEYS.

Patented Jan. 20, 1953

2,626,012

UNITED STATES PATENT OFFICE 2,626,012

FEED CONTROL FOR PAPER FILTERS

Lawrence M. Persons, Chesterfield, Mo., assignor to McQuay-Norris Manufacturing Company, St. Louis, Mo., a corporation of Delaware Application May 19, 1947, Serial No. 748,913

5 Claims. (Cl. 183—62)

The present invention relates to a feed control for paper filters. More particularly, it relates to a system typified by one wherein air, such as is used for air conditioning, is caused to flow through a filter paper to remove foreign material from the air, and wherein means are provided to cause fresh paper to be fed into the position of use when paper already in use has become so overloaded with foreign matter that the air cannot be cleaned properly thereby.

Briefly, in the system, there is a fan or blower motor, a paper feed motor, an air pressure-responsive switching device and a time delay relay. The air pressure-responsive switching device includes a venturi or the like located within the air stream so as to produce pressure variations responsive to the variations in flow of air through the filter. It has a pressure-responsive switch controlled by the pressure variation in the venturi, the switch being operated when the drop of flow through the filter to a predetermined maximum causes a pressure change of predetermined value. The pressure switch relays through a time delay switch to close the circuit to the paper feed motor for a limited period of time necessary to feed the desired amount of new filter paper at the given speed of operation of the paper motor. At the same time as the paper motor is thus caused to be operated, the circuit to the fan motor is stopped, so that the air draft will not be blown against the paper during the feeding interval.

It is an object of the invention to provide a control of the foregoing kind having each of the above mentioned features. Particularly, it is an object of the invention to provide a paper feed that operates to supply new filter paper in response to the condition wherein the old paper is no longer effective. More specifically, it is an object of the invention to provide a control that will cause new filter paper to be fed in response to the excessive charging of the old filter paper with foreign matter, and particularly to provide a control that feeds fresh filter material into use when the flow through the filter falls to a minimum desired amount. A further object of the invention is to cut off the blower motor at the time the new paper is being fed. An additional object is to cause the paper feed to be effective for a limited time, determined in the control itself, and especially one determined by a heat relay mechanism.

A specific object of the invention is to provide a heat relay mechanism that is suitable for this use. Further, an object of the invention is to provide a heat relay element of the rod and tube type that is capable of ready adjustment and that accommodates override of the actuating element thereof.

Additional objects of the invention are to provide a control of the foregoing type wherein the paper will be fed in adequate amounts to insure a proper flow of clean air. Another object of the invention is to provide a paper feed that will be stopped when all of the paper of a given supply has been used.

Reference is herein made to the cleaning of air, and to the use of filter paper, but it will be understood that the control is operative with other related systems.

In the drawings:

Fig. 1 is a diagrammatic view of the control applied to a paper feed;

Fig. 2 is a plan view of a heat relay used in the system; and

Fig. 3 is a longitudinal section on the heat relay of Fig. 2.

Referring to Fig. 1, the operating mechanism is indicated diagrammatically as including a duct 10, through which air is driven by a motor driven blower 11. This air is filtered through a paper filter on a supply roll 12, and drawn to a motor driven operating roll 13. The paper itself is designated at 14 and extends suitably across the air path so that the air is caused by the blower 11 to flow through this paper and be filtered thereby. A limit switch 15 of conventional trigger type is designed to be held in one position when the paper is extended across the duct and to operate to another position when the paper is loose.

The control elements include a pressure switch, preferably of the diaphragm type, generally indicated at 20, disposed on the outlet side of the filter and having its diaphragm exposed on one side to the pressure thereat. It has its diaphragm chamber connected by a tube 21 into the pressure side of the filter so as to respond to the pressure of air delivered to the filter sheet 14. The diaphragm is normally held up by the pressure on the outlet side counterbalancing downward pressure including that of the inlet side introduced via the tube 21.

Additionally, the control includes a time delay mechanism in the form of a heat relay and generally designated at 22. Also, there is a relay 23.

The general operation of the blower and filter mechanism is that the blower 11 operates to blow air through the filter paper 14 and deliver clean air to the point of use. The filter sheet 14 filters out foreign matter from the air. However, this filter sheet becomes overloaded with foreign matter, so that the air cannot be drawn through it and successfully cleaned. When the paper 14 across the duct becomes so charged with foreign matter, the pressure in the tube 21 and hence in the diaphragm chamber remains high, but the counter pressure on the outlet side of the filter drops. This causes the diaphragm to fall, and through the medium of the control, to be described hereinafter in greater detail, causes the blower motor to stop and causes a predetermined increment of operation of the paper motor 13, so that a predetermined amount of fresh paper is drawn into the position of use.

The diaphragm, by any suitable linkage, actuates a switch blade 26 that normally is held so as to keep its contact separated from a fixed contact 27. Should the pressure on the outlet side of the filter go down to a predetermined minimum, owing to the fact that the filter is so clogged that the blower cannot discharge the desired volume of air therethrough, the device 20 will cause the switch blade 26 to close with the contact 27.

In series with the contact 27 is a heater 30 of the heat relay mechanism 22. Fig. 3 shows this heater 30 in its preferred arrangement as being wound around a rod and tube device. A layer of mica is preferably wrapped around the outside of the tube 32, and the coil 30 is wrapped insulatively around the mica and is encased by insulating cement 31. This tube is formed preferably as an integral part of a flange 33 that may be mounted upon a base 34 so that it is held rigidly at one end.

At its opposite ends, the tube 32 is swedged in at 35 so as to form relatively friction-free guides for an inner rod 36, and to provide an air space between the rod and the inside of the tube. This rod has a different coefficient of expansion from the tube 35, and is preferably relatively free of expansion such as will be the case if it is made of invar. The outer end of the rod 36 projects through the end of the tube and is threaded to receive adjusting and lock nuts 37. The opposite end of the rod 36 projects through the flange and has a collar 38 secured at its end, this collar forming one abutment for a coil spring 39 that also acts against the flange 33, thus applying a normal pressure on the rod to the left in the views so that it can move a distance that is determined by the positioning of the nuts 37.

The leftward end of the rod 36 acts against the actuating button 40 of a switch 41, such as a micro switch.

When the coil 30 is energized, it applies heat to the tube 32 which expands. Owing to the fact that the rod 36 is relatively inexpansible, and that the end of the tube 32 is fixed, the tube will expand to the right. It abuts against the nuts 37 and thereby draws the rod 36 to the right in a sliding movement that is provided by the swedged portions 35. As the tube end moves to the right, the inner end of the relatively inexpansible rod will move to the right, thus withdrawing from the operating button 40 of the switch 41, and causing that switch to close. Any excess heating of the rod and consequent expansion thereof does not affect the switch, but merely further compresses the spring 39. When the coil is subsequently deenergized, the tube 32 contracts, and causes the rod 36 to move to the left under the influence of the spring 39, which reacts the button 40 of the switch 41. Any excessive contraction of the tube does not overforce the switch button 40 because of the one-way connection between the tube and rod in the nuts 37. The expansion of the tube is relatively small, but powerful so that it can be multiplied extraneously as in a switch. Being lineal, it does not crack the insulation—either of the mica or the like or of the cement. It permits close disposition of the heating coil around the heat-responsive element, and hence provides maximum heat input facility.

The diagram of Fig. 1 shows the switch 40 as having a movable blade with a contact that is engageable with a fixed contact 45. This is diagrammatic, as the switch is preferably a snap-action switch.

The relay 23 includes a coil 47 and a core actuated armature 48 that closes the contacts 49 when the coil is de-energized, or opens them with the energization of the coil.

The wiring includes a first power line 55 that may be connected to a terminal 56. This terminal is connected by a wire 57 to a junction 58. From this junction, a wire 59 leads to one of the contacts 49. From the other contact, a wire 60 leads to a terminal 61, and from this terminal a wire 62 leads to the motor of the blower 11. From the other side of the motor, a line 63 leads to a return power line 64, it being of course understood that this may be a grounded circuit, if desired.

Returning to the junction 58, it will be seen that there is another wire 66 leading therefrom that runs into the heating coil 30. From the other side of the coil 30, a wire 67 leads to the contact 27 of the pressure switch. The blade of the pressure switch is connected by a wire 68 to a terminal 69, from which a line 70 leads into the limit switch 15, which is connected thereafter into the line 64. It will be understood that the limit switch is normally closed, so that the circuit just described can be completed.

From the previously described terminal 56, another wire 73 leads to the switch 41. From the contact 45 of this switch, a wire 74 leads to a terminal 77 that is connected by a wire 78 to the motor 13, which is the paper motor. The other side of this motor is connected by a wire 79 to the return power line 64.

Returning to the terminal 77, it will be seen that there is another wire 82 leading therefrom to one side of the coil 47. The other side of this coil is connected by a wire 83 that leads into the wire 68, such as adjacent to the connection with the switch blade 26.

Operation

Assuming that the power lines 55 and 64 are duly energized, as by the closing of a suitable master switch (not shown), and that the filter paper is properly clean, a circuit from the blower motor will run from the line 55 to the terminal 56, thence by way of the line 57 to the junction 58, the line 59 to the contact 49, thence through the armature 48 to the other contact 49, out by way of the line 60 to the terminal 61, thence by way of the line 62 through the motor of the blower 11, and by way of the line 63 to the other power line 64. The blower motor thus can operate. At this time, the air being forced by the blower motor through the filter 14 will be filtered by the paper.

As the filter paper becomes clogged with foreign material, the flow therethrough necessarily decreases and consequently the pressure of air on the outlet side of the filter decreases. As inlet side pressure continues to act above the diaphragm, the latter will descend and cause the blade 26 to close with the contact 27. When this occurs, the heater 30 of the heat relay is energized by being put in circuit in parallel with the blower motor. The circuit from the line 55 to the junction 58 has already been traced. From the junction 58, the circuit is now additionally closed through the line 66, the heater 30, the line 67, the contact 27, the blade 26, the line 68, the terminal 69, the line 70, the limit switch 15, and the other power line 64.

Energization of the heater 30 causes the tube 32 to be heated and to expand. The period of time required for this expansion may be duly determined by adjustment of the nuts 37, as will appear, and, after such time has elapsed, the switch 41 will close the normally open contact 45. When this occurs, the relay 23 is actuated to open the blower motor circuit, and the paper motor circuit is closed. These circuits are as follows: From the first power line 55 through the terminal 56, by way of the line 73 to the blade 41, the contact 45, the line 74 to the terminal 77, the line 78, the paper feed roll motor 13, the line 79 back to the other power line 64. The paper motor may then begin to operate to draw new paper from the supply roll 12 into position across the duct.

At the same time, an additional circuit is closed from the terminal 77, this circuit being energized from the power line 55 as aforesaid through the switch 41. From the terminal 77, it continues through the line 82 to the coil 47 of the relay 23. Thence it continues by way of the line 83 to the line 68, the terminal 69, the line 70, the limit switch 15 to the return power line 64.

This last named circuit passing through the coil 47 energizes that coil and causes it to open the armature 48 from the contacts 49. This thereupon breaks the circuit to the blower motor, which must be completed through this armature to energize the line 60 leading to that blower motor.

When the blower motor stops, the pressure on the inlet side, transmitted by the tube 21 to the upper side of the diaphragm, drops, and atmospheric pressure acts upon both sides of the diaphragm. It thereupon rises to its normal upper position in a manner known in the art, and causes the blade 26 to open from the contact 27. This deenergizes the heater 30, and thereupon the tube 32 begins to cool and to contract. The time required for this contraction is also calibrated, and, after a predetermined length of time, the blade 41 is operated to separate from the contact 45, thereby again opening the circuit both to the relay and to the paper motor. When the relay coil 47 is deenergized and this relay again thereupon immediately closes the armature 48 against the contacts 49, the blower motor is put back in circuit, and it again draws air through the filter paper. If enough new filter paper has been introduced into use, so that an adequate volume of air can be blown therethrough, pressure below the diaphragm will be sufficiently high to hold the pressure-responsive device with the blade 26 open. Thereafter the operation will continue so long as the filter is not clogged. After it becomes clogged again, a new cycle will cause a new amount of filter paper to be delivered to use. If at the end of one cycle the amount of newly delivered filter paper remains inadequate for the proper supply of air to be discharged by the blower, the cycle will repeat immediately, and further paper will be put in use. When the paper finally comes off the supply roll 12 and is loose, the limit switch 15 opens, and the heater 30 is thereafter kept out of circuit, and the feed motor 13 cannot operate.

It has been found that, for a typical installation, the timing of the heat relay should be such that the paper feed motor will deliver six-inch steps of new paper. In other words, the paper motor is put in operation and the blower motor stops for such period of time as will cause the introduction of six inches of new paper into use.

The interval of each operative cycle of the feed motor 15 may be regulated by the adjusting nuts 37. If they are loosened from the position shown, a greater amount of heat input into the tube 32 is required before the rod 36 is displaced to actuate the switch. The curve of heat dissipation from the tube, and consequent shortening thereof, plotted against time, is steep at low temperatures, but flattens out at higher temperatures, as a result of which the time required for reopening of the switch is greater from high temperatures of the tube than it is from lower ones. Conversely, tightening of the nuts 37 so as to draw the rod 36 rightward in the drawing will reduce the time required for reopening of the switch.

The foregoing characteristics of the element may be determined by tests of each size of element employed, and the nuts 37 initially set for the desired period of closure of the switch 41. The motor 13 is preferably a constant speed motor, so that the number of rotations it makes is determined by the time interval during which it is energized. Thus the amount of new paper fed into position of use is adjustable by means of the nuts 37 on the relay unit.

This particular element has proved especially desirable in this control because it is dependable, both as to operating characteristics and as to durability. Its linear expansion movement assures consistent operation without injury to the coil or insulation. Likewise, overtravel, which would adversely affect the switch 41, is eliminated as a problem. The typical taking of a set by bimetal warp switches is avoided completely with this unit. Consequently, the time interval for operation of the paper motor will remain constant over a very long period of time.

It may be seen that the control is simple and dependable in operation and adjustment. The various parts including the heat relay 22, the switch and pressure operating means 20 and the relay 23, with the interconnections to and including the terminals 56, 61, 77 and 69 form a desirable grouping for a fixed assembly, with the connections therefrom to the other elements made from the terminals.

The control is clearly capable of use beyond the illustrated system, although it is especially useful therein. Various modifications of the control and system may be made, as indicated by the scope of the claims to follow.

What is claimed is:

1. In combination, a flow passage for a fluid; filter material disposed therein through which the fluid flows; first electrically operated means for causing fluid to flow through the passage; second electrically operated means for automatically changing the filter material; a relay switch; a relay switch opening means; means responsive to the flow in said passage and a flow responsive switch actuated by the means; a time delay energizing means and a time delay switch;

a circuit branch closed upon closure of the flow responsive switch for effecting energization of the time delay energizing means and consequent operation of the time delay switch; a circuit branch closed by closure of the time delay switch for energizing the relay switch opening means and consequent opening of the relay switch; an additional circuit branch for connection with said first electrically operated means, the additional circuit branch including the relay switch so that the additional branch is opened upon opening of the relay switch; and a further operating circuit branch connected with the time delay switch for control thereby and connected with said second electrically operated means.

2. In combination, a flow passage for a fluid; filter material disposed therein through which the fluid flows; first electrically operated means for causing fluid to flow through the passage; second electrically operated means for automatically changing the filter material; a relay switch; a relay switch opening means; means responsive to the flow in said passage and a flow responsive switch actuated by the means; a time delay energizing means and a time delay switch; a circuit branch closed upon closure of the flow responsive switch for effecting energization of the time delay energizing means and consequent operation of the time delay switch; a circuit branch closed by closure of the time delay switch for energizing the relay switch opening means and consequent opening of the relay switch; an additional circuit branch for connection with said first electrically operated means, the additional branch including the relay switch so that the additional branch is opened upon opening of the relay switch; a further operating circuit branch connected with the time delay switch for control thereby and connected with said second electrically operated means, the time delay energizing means including a tube and a rod of different coefficients of expansion; and a heating coil wrapped therearound.

3. In combination, a flow passage for a fluid; filter material disposed therein through which the fluid flows; first electrically operated means for causing fluid to flow through the passage; second electrically operated means for automatically changing the filter material; a first operating circuit branch connected with said first electrically operated means; a second operating circuit branch connected with the second electrically operated means; a relay switch in the first branch; a time delay switch in the second branch; a control means responsive to flow conditions in the passage; mechanism responsive to operation of the control means to close the time delay switch; means responsive to closure of the time delay switch to open the relay switch and deenergize the first branch, the control means becoming inoperative in response to conditions produced by closure of the first branch, whereby, upon opening of the first branch, the mechanism for closing the time delay switch is rendered inoperative and the time delay switch can reopen after an interval of time.

4. The combination of claim 3 wherein the time delay device comprises a tube having one coefficient of expansion, the tube being open at both ends; a rod slidable in the tube, the rod having a second coefficient of expansion and projecting from both ends of the tube; an adjustable abutment between the rod and tube at one end; and spring means yieldably holding the parts in abutting relation at said abutment, the other end of the rod comprising an operating head.

5. In combination, a flow passage for a fluid; sheet-like filter material disposed therein through which the fluid flows; a pressure-responsive switch moved to operating position in response to abnormal fluid pressure conditions in the flow system resulting from clogging of the filter material; a relay switch device including a power means and a switch operated thereby, the relay being of the type that closes the switch upon energization of the power means, but causes the switch to reopen only after lapse of a predetermined interval of time following deenergization of the power means, the relay containing manually adjustable means for varying said interval of time; a filter winding motor to replace the clogged filter material; a first circuit branch including the pressure-responsive switch and the relay power means, a second circuit branch including the winding motor and the relay switch; a fluid flow producing motor; a second relay having a second relay power means and a second relay switch; a circuit branch putting the second relay coil in parallel with the winding motor; a circuit branch including the flow motor and the second relay switch; and the second relay power means being adapted to open its switch when it is energized.

LAWRENCE M. PERSONS.

REFERENCES CITED

The following references are of record in the file of this patent:

UNITED STATES PATENTS

| Number | Name | Date |
| --- | --- | --- |
| 1,715,273 | Billings | May 28, 1929 |
| 1,982,639 | Christofferson | Dec. 4, 1934 |
| 2,119,978 | Wolthuis et al. | June 7, 1938 |
| 2,143,569 | Nessell | Jan. 10, 1939 |
| 2,152,900 | Manning | Apr. 4, 1939 |
| 2,218,453 | Mickle | Oct. 15, 1940 |
| 2,285,677 | Myers | June 9, 1942 |
| 2,343,732 | Baird | Mar. 7, 1944 |
| 2,362,570 | McCleery | Nov. 14, 1944 |
| 2,393,014 | Bartholy | Jan. 15, 1946 |
| 2,422,526 | Burch | June 17, 1947 |
| 2,423,316 | Holmes | July 1, 1947 |
| 2,451,073 | Cowherd | Oct. 12, 1948 |